United States Patent Office 3,447,120
Patented May 27, 1969

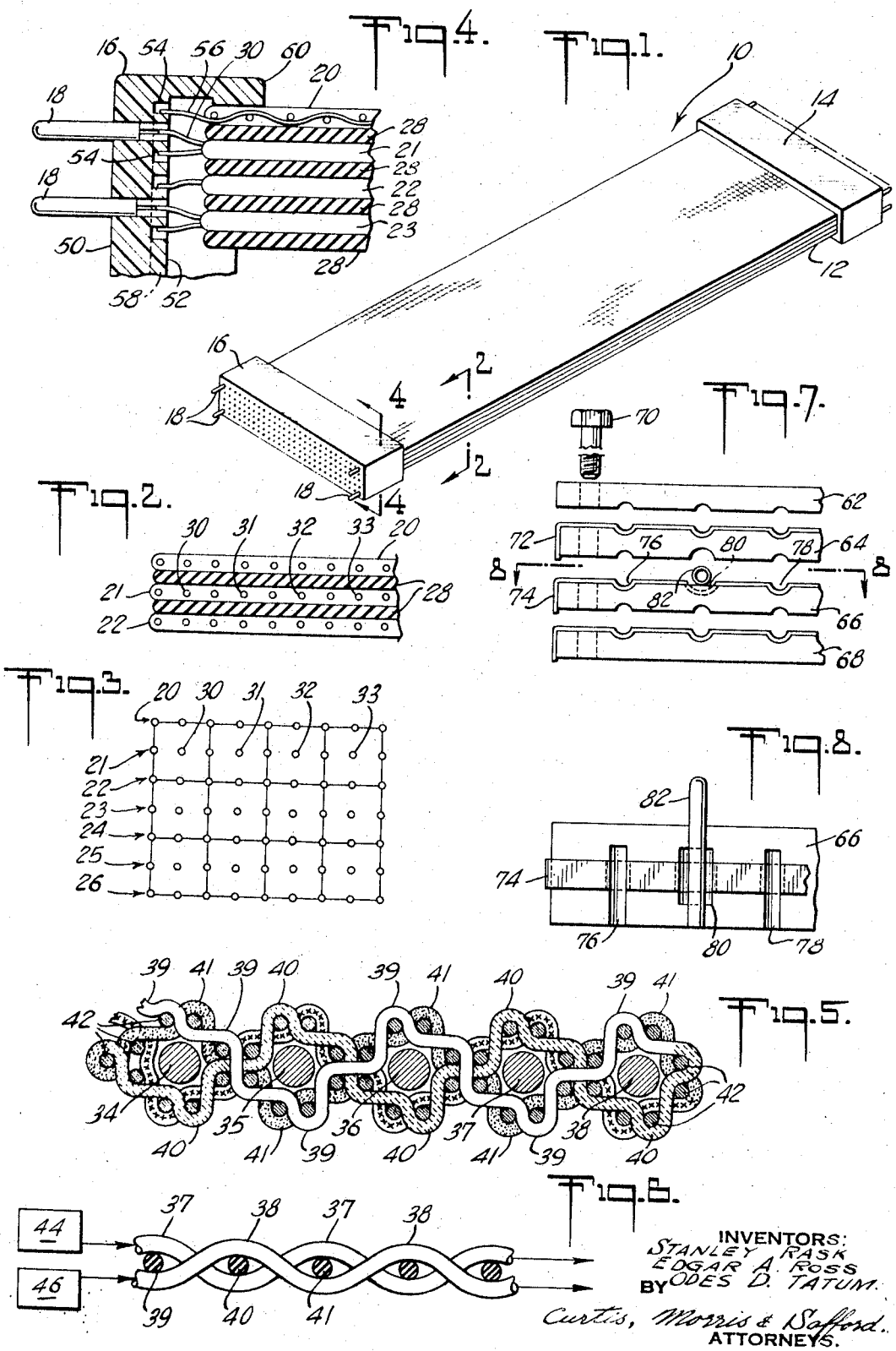

3,447,120
WOVEN HIGH-FREQUENCY TRANSMISSION LINE
Stanley Rask, New York, N.Y., and Edgar A. Ross and Odes D. Tatum, Jr., Greenville, S.C., assignors to Southern Weaving Company, Greenville, S. C.
Filed June 5, 1967, Ser. No. 643,590
Int. Cl. H01r 11/02; H01b 7/08, 11/02
U.S. Cl. 339—143                              11 Claims

ABSTRACT OF THE DISCLOSURE

The transmission line is composed of a plurality of flat woven cables with flexible insulation material separating the individual cables. Each individual cable has warp wires interwoven with insulating warp and fill threads to form a thin, flat cable in which the warp wires are covered and separated from one another by the insulation threads. The warp wires have an undulating, approximately sinusoidal shape, and are aligned with one another so that the undulations in adjacent wires are approximately 180° out of phase with one another. Alternate cables are ground or shield cables in which all of the wires are connected together. The other cables are signal cables in which alternate wires are connected to the ground cables so as to completely surround and shield each signal conductor.

---

This invention relates to electrical transmission lines; more particularly, this invention relates to woven shielded cable for use in transmitting high-frequency electrical signals.

A major object of the present invention is to provide transmission line and cable which is capable of transmitting high-frequency electrical signals with high fidelity, relatively low propagation delay, and low "cross-talk," and yet is highly flexible, low in volume, and can be bent in a relatively very tight bend radius.

The above objects are met in the present invention by providing a laminated transmission line in which each lamination comprises a separate cable of interwoven conductors and insulation threads. Individual wires in each cable have an undulating shape, with the undulations in adjacent wires being approximately 180° out of phase with one another. Highly effective shielding is provided by connecting all of the wires together in alternate cables, denoted ground cables, and in the remaining cables, connecting alternate wires to the ground cables so as to surround each remaining wire with interconnected conductors.

The invention now will be explained with the assistance of the drawings in which:

FIGURE 1 is a perspective view of a transmission line constructed in accordance with the present invention;

FIGURE 2 is a partially broken-away cross sectional view taken along line 2—2 of FIGURE 1;

FIGURE 3 is a schematic diagram illustrating the interconnection of the conductors in the cable portion shown in FIGURE 2;

FIGURE 4 is a cross sectional, broken-away view taken along line 4—4 of FIGURE 1;

FIGURES 5 and 6 are schematic views showing the weaving pattern used in the individual cables of the transmission line shown in FIGURE 1;

FIGURE 7 is an exploded view of an alternative terminal for use in connection with the cables shown in FIGURE 1; and FIGURE 8 is a cross sectional view taken along line 8—8 of FIGURE 7.

The transmission line 10 shown in FIGURE 1 includes a flexible laminated body portion 12 with terminal connectors 14 and 16 at the ends of the line, the connectors having electrical connector pins 18 extending from them. As is shown in FIGURES 2 and 4, the flexible body portion 12 is composed of a plurality of flat woven cables stacked on top of one another with layers of flexible insulating material 28 secured between adjacent cables. The cables preferably are secured to the insulating layers 28 by means of an adhesive. As will be described in greater detail below, each of the cables 20, 21, 22, etc., is itself a flexible woven structure which includes a plurality of longitudinally-extending conductors such as 30, 31, 32 and 33 (FIGURE 3) interwoven with flexible insulating threads. Thus, the body 12 is capable of being bent into a curve of relatively small radius without adversely effecting the electrical characteristics of the transmission line.

FIGURE 3 is a schematic diagram illustrating how conductors in various of the different cables are connected together to form a shielded transmission line. FIGURE 3 shows seven individual cables 20, 21, 22, 23, 24, 25 and 26. However, each transmission line can be made up of any desired number of cables depending upon the number of signal conductors needed in a particular circuit. Similarly, each cable can have as many longitudinal conductors as is needed in a given circuit.

The shielding system of the present invention includes the alternate cables 20, 22, 24 and 26, each of which has all of its conductors connected together, and is designated a "ground cable." The cables 21, 23 and 25 between the ground cables are designated "signal cables." Alternate wires such as wires 30, 31, 32 and 33 are used as signal conductors, and the remaining wires in each signal cable are connected to the ground cables. Thus, each signal cable is surrounded by a shield composed of eight interconnected wires.

FIGURES 5 and 6 illustrate schematically how each of the cables is woven. FIGURE 5 is a cross sectional view of a cable like that shown in FIGURE 2, except that the cable has only five wires 34, 35, 36, 37 and 38. Each of the wires 34–38 extends through the fabric as a warp element. It is interwoven with warp threads 42 which are made of insulating material (preferably fiberglass), and a continuous insulating fill thread, also fiberglass, various parts of which are identified by the numerals 39, 40 and 41. The insulating warp threads 42 are woven in a pattern such that eight separate threads form a tube around each warp wire. Thus, the warp threads completely surround each warp wire and effectively insulate it on all sides.

The continuous fill thread passes over one warp wire, under the next, over the next, under the next, etc., and also is interwoven with the insulating warp threads 42. Starting at the upper left-hand corner of FIGURE 5, the fill thread portion 39 first passes over the wire 34, then under the wire 35, over the wire 36, under the wire 37, and over the wire 38. It passes around the wire 38 and then the next portion 40 of the thread passes back through the fabric in an opposite pattern; that is, under wire 38, over wire 37, under wire 36, over wire 35, and under wire 34. Then, the fill thread passes back through the fabric again, as is indicated by portion 41, which repeats the weaving pattern of the thread portion 39. It should be understood that all of the insulating threads preferably are of stranded fiberglass. As a result, the threads actually spread out into somewhat flattened, oval cross sectional shapes and are not perfectly round as is shown in FIGURE 5. The threads are pulled tight in the weaving process so that a smooth, flat cable is produced.

Each of the warp wires 34–38 preferably is made of stranded wire. For example, in one cable which actually has been produced, the warp conductors each comprise seven strands of #38 gage tinned copper wire. When the fill threads are tightly interwoven with the warp wires in the pattern described above, the warp wires are distorted into undulating, approximately sinusoidal shapes such as those shown in FIGURE 6. It is to be noted that the insulating warp threads have been omitted from FIGURE 6 for the sake of clarity. FIGURE 6 shows that the sinusoidal patterns of adjacent wires such as wires 37 and 38 are approximately 180° out of phase with one another. It has been found, quite unexpectedly, that this arrangement greatly reduces the capacitance and other undesirable features of the cable when transmitting high-frequency signals. Thus, for example, if high-frequency (e.g., one megacycle) signals are sent over each of the separate wires 37 and 38 by separate signal generators 44 and 46, respectively, it will be found that there is extremely low cross-talk between the wires, and that the cable has very little propagation delay; that is, the time required for the signal to travel from one end of the conductor to the other will be quite low.

A transmission line constructed in accordance with the disclosures in FIGURES 1 through 6 has been tested by passing signals through it at a one megacycle per second repetition rate. The rise and fall time of the pulses; i.e., the time required for the signal to increase or decrease between 10 percent and 90 percent of maximum value, was less than one nanosecond (one billionth of a second). These pulses were transmitted through the cable with high fidelity. Morover, the cable was found to have extremely low propagation delay. The measured delay was less than 1.4 nanoseconds per foot. That is, the signal travel time from one end of the cable to the other was less than 1.4 nanoseconds per foot of transmission line. Moreover, the spacing between wires in the cable was relatively small e.g., 0.050 inch. Thus, the line was relatively compact, and yet was quite flexible despite having between 10 and 22 separate cable layers. The cable was capable of being bent into an arc having only a 12 inch radius without adversely affecting its electrical characteristics.

Another advantage of transmission line constructed in accordance with the present invention is that it is relatively easy to connect to terminals. The cable preferably is produced in long strips on automated looms which are programmed with punch-cards or other means to produce the weave pattern desired. The fabric then is cut into strips of a desired length, the strips are stacked and secured together, the wires at the ends of the cut strips are bared, and the connectors 14 and 16 are added. Stripping the wires of insulation at the ends of the cable segments is made quite easy, in accordance with the present invention, by "floating" portions of the warp wires at spaced intervals during manufacture. "Floating" involves bringing the wires up out of the insulating fabric and onto its upper surface for a distance, and then bringing them back into the fabric. Thus, simply by cutting the fabric at the position where the wires have been "floated," the fabric can be cut away easily and bare wires will remain, ready for securing to terminals. If all of the wires of the cable are to be connected together at the ends, all of the wires can be floated onto one side of the cable. However, in signal cables, it is preferred to bring ground wires out on one side of the cable and signal wires out on the other side of the cable so that the signal and ground wires already will be separated when the fabric is cut. This greatly facilitates connection of the wires to terminals.

The manner of connection of the cable wires to the connector 16 is illustrated in FIGURE 4. The connector 16 includes a plastic insulating body 50 in which are imbedded the terminal pins 18. Imbedded in the inner surface 52 of the insulating body 50 are horizontally-extending bus bars 54. All of the wires of the ground cables are connected to such a conductive bus bar. Furthermore, all of the bus bars themselves are connected together vertically by another but bar 58 which is shown in dashed outline in FIGURE 4. The uppermost cable 20 is a ground cable. Therefore, the ends 56 of its conductors are secured to the bus bar 54, preferably by soldering or the like, to connect all of the conductors in the cable 20 together. The next cable 21 is a signal cable and its signal wires such as wire 30 are "floated" on the upper side of the cable 21 and are soldered into the hollow inner ends of the terminals 18. The ground wires from signal cable 21 are "floated" downwardly and are connected to the second horizontal bus bar. Thus, all of the ground wires of the signal cable are connected to the conductors in the ground cable 20 and all of the other ground cables in the transmission line 10. The upper edge 60 and the lower edge (not shown) of the connector 16 advantageously clamp the layers of cable between them so as to provide stress relief for the transmission line.

An alternative connector is shown in FIGURES 7 and 8. FIGURE 7 is an exploded view showing four insulating blocks 62, 64, 66 and 68 which are to be stacked together to form the connector. The blocks are secured together tightly by a bolt 70 which passes through all of them. The uppermost block 62 has several approximately semicircular grooves which mate with similar grooves on the next block 64 to form holes into which the wires in a ground cable can be inserted and clamped. The upper surface and the left end of the block 64 has a metallic coating 72 which extends downwardly into the grooves in the upper surface of block 64. When the blocks 62 and 64 are clamped together, the wires in the ground cable will be clamped between the blocks and the metallic coating 72 will, in effect, be a bus-bar connecting the ground wires together. The left end of metallic coating 72 extends downwardly so as to make contact with similar coating on other members to provide interconnection between ground cables and ground wires.

The block 66 cooperates with the grooved underside of the block 64 to provide proper termination for a signal cable. The upper surface of block 66 is shown in FIGURE 8. A narrow metallic coating 74 is provided down the center of the block. It passes through ground wire grooves 76 and 78 to provide a bus-bar connection between those grooves. The metal strip 74 also passes through a relatively deep semi-cylindrical hole 80 which passes underneath a terminal pin 82. As is shown in FIGURE 7, the terminal member 82 rests on the upper surface of the block 66 and passes over the strip 74 without contacting the strip.

The block 68 cooperates with the groove undersurface of block 66 to provide a connector for another ground cable, in the same manner as do blocks 62 and 64.

Interconnections between ground wires also can be made by utilizing a fill wire in each ground cable. The fill wire would connect all of the wires together so that no terminal bus bar would be required. The ground wires in the signal cables also can be connected together by means of an interwoven fill wire which is woven so as to contact the ground wires but not the signal wires.

The above description of the invention is intended to be illustrative and not limiting. Various changes or modifications in the embodiments described may occur to those skilled in the art and these can be made without departing from the spirit or scope of the invention.

We claim:

1. A woven high-frequency electrical transmission line comprising, in combination, a plurality of flat woven cables including at least one ground cable and at least one signal cable, each cable comprising elongated conductors interwoven with mutually insulating threads, said cables being stacked one upon the other and joined together in mutually insulated electrical relationship to one another, ground connector means for conductively connecting the conductors of said ground cable together, and for conductively connecting selected ones of the conductors in said signal cable to said ground cable, said selected conductors serving as ground conductors, the remaining conductors in said signal cable serving as signal conductors, each with at least one ground conductor on each side of it.

2. Apparatus as in claim 1 in which said transmission line includes at least two of said ground cables, one above and the other below said signal cable, with said ground conductors in said signal cable being connected to both of said ground cables.

3. Apparatus as in claim 1 in which each of said conductors has an undulating shape, with the undulations of each conductor in each cable being aligned approximately 180° out of phase with the undulations of each adjacent conductor in that cable.

4. Apparatus as in claim 1 in which said ground conductors in said signal cable comprise alternate ones of the conductors in said signal cable.

5. Apparatus as in claim 1 in which said conductors are warp wires, with said ground wires of said signal cable extending outwardly from one face of said signal cable at one end of said cable and said signal conductors extending outwardly from the other face of said cable at said one end.

6. Apparatus as in claim 2 in which said transmisison line includes a terminal connector at one end of said line, said connector including bus-bar means for interconnecting the conductors in said ground cables and the ground conductors in said signal cable, and conductive terminals connected to said signal conductors.

7. Apparatus as in claim 6 in which said conductors "float" from the fabric of each cable at each end thereof the signal conductors and ground conductors "floating" on opposite sides of said signal cable.

8. A woven high-frequency transmission line, said transmission line comprising, in combination, a plurality of flat woven cables stacked one upon the other with flexible insulation between cables, each cable comprising a plurality of warp wires with a plurality of insulating fiberglass warp threads between and covering adjacent wires, an insulating fibergalss fill thread interwoven with said warp wires and threads in covering relationship to said warp wires, whereby said wires are covered by said insulating threads, each of said warp wires having a substantially sinusoidal shape, with the shape of each wire being approximately 180° out of phase with the shape of the wire adjacent to it, means connecting together all of the wires of alternate cables to form them into ground cables, the remaining cables being signal cables, and terminal means for connecting alternate wires in each of said signal cables to the wires in the ground cables, and for providing terminals for the remaining wires in said signal cables.

9. A woven high-frequency electrical signal transmission cable comprising, in combination, a plurality of elongated conductors interwoven with a plurality of insulating threads which mutually insulate said conductors from one another, said conductors being aligned in side-by-side relationship to one another, each of said conductors having an undulating shape and being aligned in said cable with its undulations approximately 180° out of phase with the undulations of each adjacent conductor, and terminal means for connecting certain conductors of said cable to a source of high-frequency electrical signals.

10. Apparatus as in claim 9 in which said conductors are warp wires and said cable includes an insulating fill thread woven back and forth between said warp wires and forming said wires into said undulating shape.

11. Apparatus as in claim 10 including a plurality of insulating warp threads interwoven with said fill thread to form a separate tube surrounding each warp wire.

References Cited

UNITED STATES PATENTS

| | | |
|---|---|---|
| 417,402 | 12/1889 | Balsley. |
| 473,352 | 4/1892 | Sawyer. |
| 1,696,411 | 12/1928 | Peck. |
| 2,997,519 | 8/1961 | Hines et al. _____ 333—96 XR |
| 3,004,229 | 10/1961 | Stearns _____ 333—1 XR |
| 3,179,904 | 4/1965 | Paulsen _____ 333—1 |
| 3,197,555 | 7/1965 | Mittler. |

FOREIGN PATENTS

| | | |
|---|---|---|
| 478,577 | 1/1938 | Great Britain. |

MARVIN A. CHAMPION, *Primary Examiner.*

PATRICK A. CLIFFORD, *Assistant Examiner.*

U.S. Cl. X.R.

174—117; 333—1; 339—29